United States Patent [19]
Schmidt et al.

[11] Patent Number: 5,933,944
[45] Date of Patent: Aug. 10, 1999

[54] ARTICLE FEEDING ARRANGEMENT

[75] Inventors: Volker Schmidt, Lexington; Jeffery P. Harris, Owingsville, both of Ky.

[73] Assignee: Eastlex Machine Corporation, Lexington, Ky.

[21] Appl. No.: 08/901,751

[22] Filed: Jul. 28, 1997

[51] Int. Cl.⁶ .............................. B23P 19/00; B23P 19/06
[52] U.S. Cl. ................................. 29/809; 29/798; 29/818; 221/273
[58] Field of Search ........................... 29/798, 809, 818; 221/273, 274

[56] References Cited

U.S. PATENT DOCUMENTS

| | | | |
|---|---|---|---|
| 867,834 | 10/1907 | Neureuther | 221/273 |
| 925,088 | 6/1909 | Grossman | 221/273 |
| 972,649 | 10/1910 | Rose | 221/273 |
| 1,342,331 | 6/1920 | Havener | 221/273 |
| 1,575,596 | 3/1926 | Warner | 221/273 |
| 1,692,033 | 11/1928 | Gray | 221/273 |
| 3,101,528 | 8/1963 | Erdmann | 29/211 |
| 3,169,661 | 2/1965 | Klotz | 221/273 |
| 3,971,116 | 7/1976 | Goodsmith et al. | 29/208 |

FOREIGN PATENT DOCUMENTS 60-217025  10/1985  Japan ........................................ 29/235

*Primary Examiner*—S. Thomas Hughes
*Assistant Examiner*—John Preta
*Attorney, Agent, or Firm*—Frank C. Leach, Jr.

[57] ABSTRACT

A fastener apparatus, which attaches a first article to a second article at a setting station, includes a plate-like support, a feed in finger for receiving and engaging a first article at a first predetermined position, and a lever pivotally mounted on the support and pivotally connected to the feed in finger. A spring continuously urges the lever to pivot to move the feed in finger along a substantially horizontal predetermined path from the first predetermined position to a second predetermined position at the setting station. A cam surface of a cam element, which is vertically movable in response to vertical movement of a ram housing, acts on a roller on the lever for rendering the spring ineffective and for moving the feed in finger from the second predetermined position to the first predetermined position. A die, which is connected to the ram, engages the first article at the second predetermined position after the feed in finger has been moved from the second predetermined position to the first predetermined position with the die moving the article substantially perpendicular to the predetermined path to move the first article into engagement with a second article at the setting station.

16 Claims, 3 Drawing Sheets

ARTICLE FEEDING ARRANGEMENT

This invention relates to an article feeding arrangement and, more particularly, to a feeding device for use in an apparatus for attaching fasteners to material in which positioning of an article feed in finger is controlled.

U.S. Pat. No. 5,319,848 to Schmidt et al, which is incorporated by reference herein, discloses an apparatus for attaching fasteners, which are articles, to each other through a material. In the aforesaid Schmidt et al patent, motion of the feed in finger for feeding an article such as a socket, for example, along a reciprocating linear path is controlled by two separate springs. The force of one spring continuously urges the feed in finger inwardly, and the force of the other spring overcomes the force of the one spring when outward motion of the feed in finger is to occur.

While this arrangement is generally satisfactory, the use of two springs with one overriding the other to retract the feed in finger occasionally causes an article to be caught during its feed to a setting station. This is because there is no positive mechanical control of the feed in finger during its feeding of the article to the setting station. Instead, the force of one of the springs control the position of the feed in finger when the feed in finger is moved towards the setting station.

The article feeding arrangement of the present invention satisfactorily overcomes the foregoing problem through utilizing a single spring for continuously urging the feed in finger to a position at a setting station at which the socket is disposed for engagement by a die moved by a vertically movable ram with the feed in finger being withdrawn before the socket is engaged by the die. This is accomplished through mechanically controlling the retraction of the feed in finger in response to the downward axial motion of the ram with advancement of the feed in finger by the single spring being in response to upward axial motion of the ram.

An object of this invention is to provide an improved arrangement for feeding an article to a predetermined position in a fastening apparatus.

Another object of this invention is to provide an article feeding arrangement in which a mechanical stop is employed to insure that the feed in finger is fully retracted prior to when the article is to be engaged by the die due to downward axial motion of the ram of the fastening apparatus and held in that position until the ram has substantially completed its upward axial motion.

Other objects of this invention will be readily perceived from the following description, claims, and drawings.

This invention relates to a fastener apparatus for attaching a first article to a second article at a setting station including a feed in finger for receiving and engaging a first article at a first predetermined position. Continuously urging means continuously urges the feed in finger along a predetermined path from the first predetermined position towards a second predetermined position at the setting station. Article engaging means engages the first article at the second predetermined position to move the first article out of the predetermined path of the feed in finger and to move the first article towards a second article at the setting station for attachment thereto. Moving means moves the feed in finger away from the second predetermined position to the first predetermined position to receive and engage another first article with the moving means being movable in response to movement of the article engaging means. The moving means includes means for rendering the continuously urging means ineffective until the article engaging means has returned to a position in which it will not interfere with movement of the feed in finger from the first predetermined position to the second predetermined position by the continuously urging means.

This invention also relates to a fastener apparatus for attaching a first article to a second article at a setting station including support means, a feed in finger for receiving and engaging a first article at a first predetermined position, and a lever pivotally mounted on the support means and pivotally connected to the feed in finger. A spring causes the lever to pivot to move the feed in finger along a predetermined path from the first predetermined position to a second predetermined position at the setting station. Acting means acts on the lever for rendering the spring ineffective and moving the feed in finger from the second predetermined position to the first predetermined position.

The attached drawings illustrate a preferred embodiment of the invention, in which.

Figure 1:
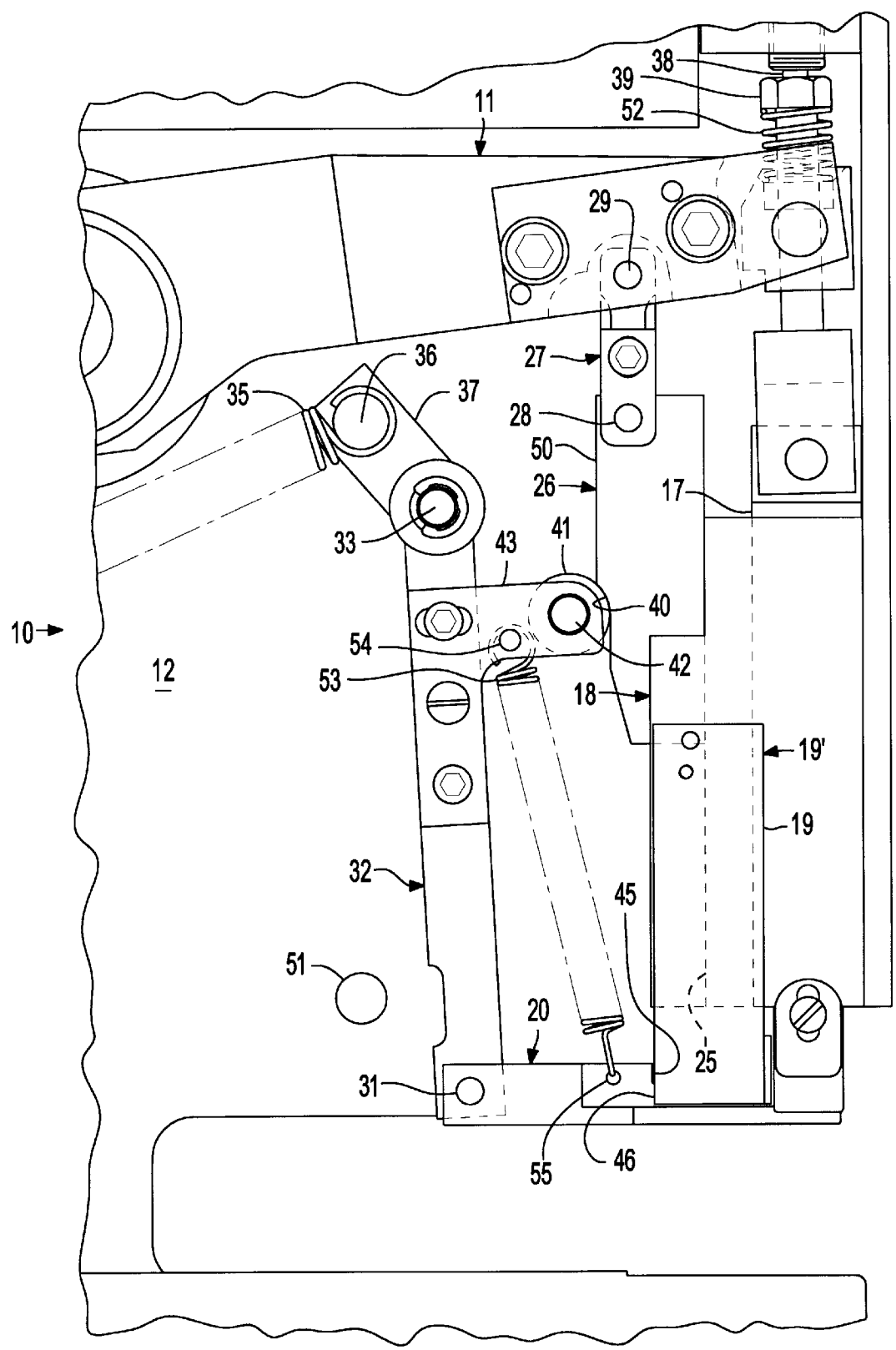
FIG. 1 is a fragmentary side elevational view of a portion of a fastener attaching apparatus having an article feeding arrangement with a feed in finger in its fully inserted position in which an article is at a setting station.

Referring to the drawings and particularly FIG. 1, there is shown a portion of a fastener apparatus 10, which is shown and described in the aforesaid Schmidt et al patent, for attaching fasteners to material. An upper power arm 11 of the fastener apparatus 10 is preferably driven in the manner shown and described in the aforesaid Schmidt et al patent.

Figure 4:
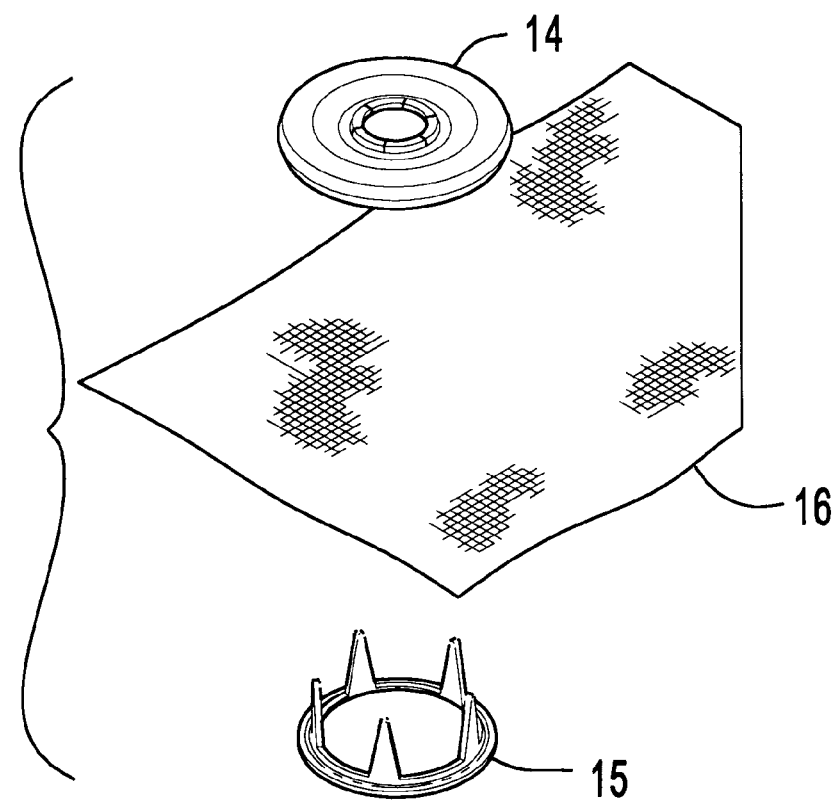
FIG. 4 is a perspective view of a socket, a ring having prongs to which the socket is to be attached, and material through which the prongs pass when the socket and the ring are attached to each other by the fastener attaching apparatus having the article feeding arrangement of the present invention.

The upper power arm 11 is pivotally mounted on a plate-like support 12 through a shoulder shaft (not shown) supported by the support 12 and extending therefrom. Thus, as shown and described in the aforesaid Schmidt et al patent, clockwise pivoting of the upper power arm 11 from the position of FIG. 1 to the position of FIG. 2 causes attachment of a first article such as a socket 14 (see FIG. 4), for example, to a second article such as a ring 15, for example, through a material 16 in the manner shown and described in the aforesaid Schmidt et al patent.

The clockwise pivoting of the upper power arm 11 (see FIG. 1) causes vertical downward axial motion of a ram 17 to move the socket 14 (see FIG. 4) downwardly. The ram 17 (see FIG. 1) is slidably disposed within a ram housing 18, which is supported by the support 12, for only axial motion. The ram 17 has axial motion in both directions due to pivoting of the upper power arm 11 in both clockwise and counterclockwise directions.

The socket 14 (see FIG. 4) is moved along a predetermined path from a first predetermined position to which the socket 14 is fed through a lower portion 19 (see FIG. 2), which is supported by the ram housing 18, of a curved upper feed chute 19' from a suitable hopper, for example, in the manner shown and described in the aforesaid Schmidt et al patent. The socket 14 (see FIG. 4) is engaged by a slidable feed in finger 20 (see FIG. 1), which reciprocates in a substantially horizontal guide channel as shown and described in the aforesaid Schmidt et al patent, for advancement from the first predetermined position (This is the position of the feed in finger 20 in FIG. 2.).

Figure 2:
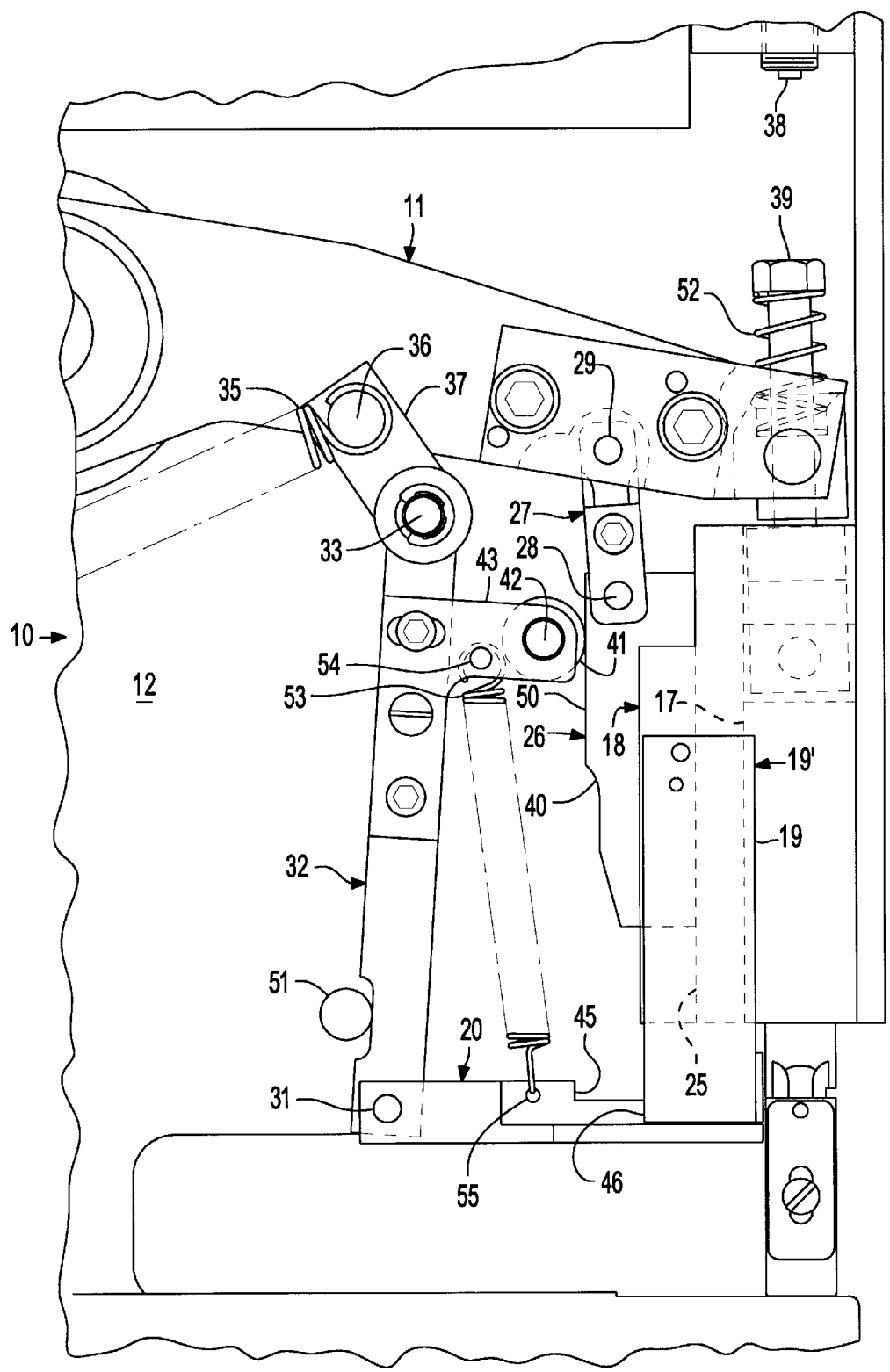
FIG. 2 is a side elevational view, similar to FIG. 1, of a portion of the attaching apparatus in which the article feeding arrangement has the feed in finger mechanically held in its maximum retracted position.
Figure 3:
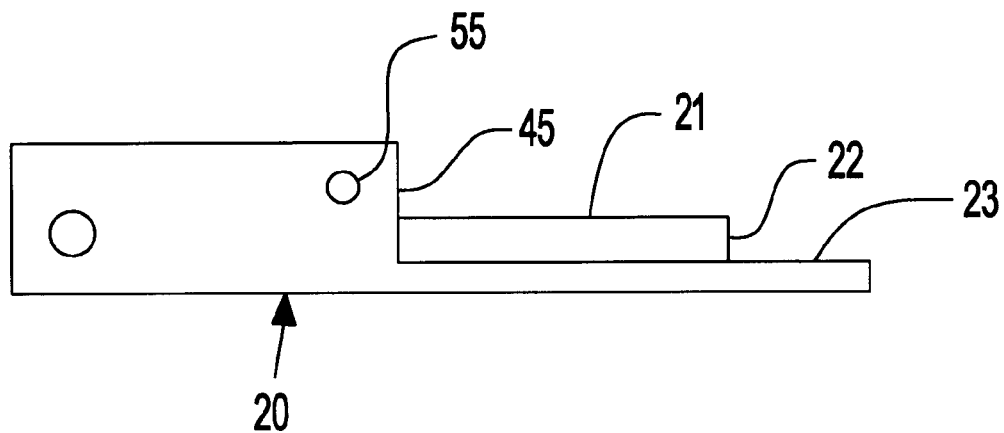
FIG. 3 is a side elevation view of the feed in finger.

When the feed in finger 20 is disposed in the position of FIG. 2, the socket 14 (see FIG. 4) is fed substantially horizontal, as shown and described in the aforesaid Schmidt et al patent, to a second predetermined position, which is a setting station, by advancement through the substantially horizontal guide channel. As shown and described in the aforesaid Schmidt et al patent, the advancement of the feed in finger 20 from the first predetermined position disposes a substantially horizontal portion 21 (see FIG. 3) of the feed in finger 20 to block the exit of the lower portion 19 (see FIG. 2) of the curved upper feed chute 19' to prevent another of the sockets 14 (see FIG. 4) from entering the guide channel from the lower portion 19 (see FIG. 2) of the curved upper feed chute 19'.

The feed in finger 20 (see FIG. 3) includes a vertical surface 22 to engage the socket 14 (see FIG. 4), which rests on a horizontal surface 23 (see FIG. 3) of the feed in finger 20, to advance the socket 14 (see FIG. 4) from the guide channel to the setting station. As shown and described in the aforesaid Schmidt et al patent, the feed in finger 20 (see FIG. 1) is reciprocated along a predetermined path once during each cycle of operation of the fastener apparatus 10.

The ram housing 18 has a vertical slot or groove 25 within which is slidably disposed a vertically movable cam element 26. The cam element 26 has its upper end pivotally connected to the lower end of a connector 27 by a pivot pin 28. The connector 27 has its upper end pivotally connected by a pivot pin 29 to the upper power arm 11.

The feed in finger 20 has its rear end pivotally connected by a pivot pin 31 to the lower end of a pivotally mounted lever 32. The lever 32 is attached to a pivot pin 33, which is pivotally mounted on the support 12 and extends therefrom.

A spring 35 continuously urges the lever 32 counterclockwise about the axis of the pivot pin 33. The spring 35 has one end connected to a stud 36 on an extension 37 of the pivot pin 33. The spring 35 has its other end connected to a pivotally mounted feed arm, which is pivotally connected to the rear end of a lower feed in finger as shown and described in the aforesaid Schmidt et al patent. The lower feed in finger feeds the ring 15 (see FIG. 4) to the setting station in the manner shown and described in the aforesaid Schmidt et al patent. Thus, the spring 35 (see FIG. 1) continuously urges the feed in finger 20 to the second predetermined position at which the socket 14 (see FIG. 4) is at the setting station.

In order for the feed in finger 20 (see FIG. 1) to be moved inwardly by the spring 35 from the position of FIG. 2 to the position of FIG. 1, the upper power arm 11 must be in its uppermost position in which a fixed stop 38 on the support 12 is engaged by a cap nut 39 in the manner shown and described in the aforesaid Schmidt et al patent. When the upper power arm 11 is in its uppermost position, a curved cam surface 40 of the movable cam element 26 engages a roller 41, which is rotatably mounted by a pin 42 on a bifurcated arm 43 of the lever 32. This is the position shown in FIG. 1.

Inward motion of the feed in finger 20 by the spring 35 is limited by engagement of a vertical surface 45 of the feed in finger 20 with a vertical surface 46 of the lower portion 19 of the curved upper feed chute 19'. The lower portion 19 of the curved upper feed chute 19' is supported on the ram housing 18.

Thus, engagement of the surfaces 45 and 46 insures that the socket 14 (see FIG. 4) is disposed at the second predetermined position in which it will be engaged by a die connected to the ram 17 (see FIG. 1), as shown and described in the aforesaid Schmidt et al patent, when the ram 17 is moved downwardly by the upper power arm 11. This moves the socket 14 (see FIG. 4) into engagement with the ring 15 through the material 16.

When the ram 17 (see FIG. 1) begins its downward movement from the position of FIG. 1 because of clockwise pivoting of the upper power arm 11, a straight cam surface 50 of the cam element 26 engages the roller 41 to pivot the lever 32 clockwise about the pivot pin 33. The clockwise pivoting of the lever 32 continues until the lever 32 engages a stop pin 51 on the support 12 as shown in FIG. 2. In this position, the feed in finger 20 is disposed in its first predetermined position to receive another of the sockets 14 (see FIG. 4) from the lower portion 19 (see FIG. 2) of the curved feed chute 19' and cannot interfere with downward movement of the ram 17 and the connected die.

Thus, the socket 14 (see FIG. 4) is moved by the die substantially perpendicular to its motion by the feed in finger 20 (see FIG. 2). The ram 17 has completed its downward motion so that the socket 14 (see FIG. 4) is now attached through the material 16 to the ring 15, which is moved upwardly to engage the socket 14 as shown and described in the aforesaid Schmidt et al patent.

As the ram 17 (see FIG. 2) is retracted upwardly from the position of FIG. 2 to the position of FIG. 1 when the upper power arm 11 pivots counterclockwise, the feed in finger 20 remains in the position of FIG. 2 until the cap nut 39 engages the fixed stop 38. This is because of the length of the straight cam surface 50 of the cam element 26.

Because of an over-travel spring 52, additional motion of the ram 17 can occur. It is only after engagement of the cap nut 39 with the fixed stop 38 that the roller 41 enters the curved cam surface 40 of the cam element 26 as shown in FIG. 1. Therefore, the feed in finger 20 is mechanically prevented from being in the path of the ram 17 and the elements movable therewith, as shown and described in the aforesaid Schmidt et al patent, until there has been complete withdrawal from the setting station of the ram 17, the die, and the other elements movable with the ram 17.

A spring 53 continuously urges the feed in finger 20 counterclockwise about the pivot pin 31. This insures that the substantially horizontal portion 21 (see FIG. 3) of the feed in finger 20 is always held against the top of the substantially horizontal guide channel as shown and described in the aforesaid Schmidt et al patent.

The spring 53 has its upper end attached to a pin 54 on the arm 43 of the lever 32. The spring 53 has its lower end attached to the feed in finger 20 through an opening 55 in the feed in finger 20.

While the feed in finger 20 has been shown and described as reciprocating along a linear path, it should be understood that such is not a requisite although it is preferred. Thus, the feed in finger 20 could move along a curved path, for example, as long as it is removed from the path of the ram 17 when the ram 17 moves downwardly.

An advantage of this invention is that the feed in finger is mechanically prevented from being disposed within the path of the means for moving the socket into engagement with the ring and the material. Anther advantage of this invention is that the feed in finger is always precisely located at a desired position relative to the motion of the ram and in accordance with the motion of the ram.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A fastener apparatus for attaching a first article to a second article at a setting station including:

a feed in finger for receiving and engaging a first article at a first predetermined position;

continuously urging means for continuously urging said feed in finger along a predetermined path from the first predetermined position towards a second predetermined position at the setting station;

article engaging means for directly engaging the first article at the second predetermined position to move the first article out of the predetermined path of said feed in finger and to move the first article into engagement with a second article at the setting station for attachment thereto;

moving means for moving said feed in finger linearly away from the second predetermined position to the first predetermined position to receive and engage another first article, said moving means moving said feed in finger in direct response to movement of said article engaging means;

and said moving means including means for rendering said continuously urging means ineffective until said article engaging means has returned to a position in which it will not interfere with movement of said feed in finger from the first predetermined position to the second predetermined position by said continuously urging means.

2. The apparatus according to claim 1 including means for causing said article engaging means to be effective after said moving means has moved said feed in finger along the predetermined path away from the second predetermined position.

3. The apparatus according to claim 2 in which said continuously urging means includes a spring.

4. The apparatus according to claim 1 in which:

said article engaging means engages the first article at the second predetermined position to move the first article substantially perpendicular to the predetermined path of said feed in finger for attachment to a second article at the setting station;

and causing means for causing said article engaging means to be effective after said moving means has moved said feed in finger along the predetermined path away from the second predetermined position to the first predetermined position.

5. The apparatus according to claim 4 in which said continuously urging means includes a spring.

6. The apparatus according to claim 1 in which:

said article engaging means engages the first article at the second predetermined position to move the first article substantially perpendicular to the predetermined path of said feed in finger for attachment to a second article at the setting station;

and causing means for causing said article engaging means to be effective during the same cycle of operation after said moving means has moved said feed in finger along the predetermined path away from the second predetermined position to the first predetermined position.

7. A fastener apparatus for attaching a first article to a second article at a setting station including:

support means;

a feed in finger for receiving and engaging a first article at a first predetermined position;

a lever pivotally mounted on said support means and pivotally connected to said feed in finger;

a spring causing said lever to pivot to move said feed in finger along a predetermined path from the first predetermined position to a second predetermined position at the setting station;

moving means acting on said lever for rendering said spring ineffective and moving said feed in finger linearly from the second predetermined position to the first predetermined position;

power means for powering said moving means when the first article at the second predetermined position is to be moved into engagement with a second article at the setting station for attachment thereto;

said power means including article engaging means for directly engaging the first article at the second predetermined position after said feed in finger has been moved from the second predetermined position to the first predetermined position;

and said moving means moving said feed in finger in direct response to movement of said article engaging means.

8. The apparatus according to claim 7 in which:

the predetermined path of said feed in finger is a reciprocating linear path;

and said article engaging means is moved substantially perpendicular to the reciprocating path of said feed in finger.

9. The apparatus according to claim 8 in which:

said lever has a roller;

and said moving means includes linearly movable cam means having cam surfaces cooperating with said roller to control whether said spring or said linearly movable cam means controls the position and movement of said feed in finger.

10. The apparatus according to claim 7 in which said article engages for engaging the first article at the second predetermined position during the same cycle of operation after said feed in finger has been moved from the second predetermined position to the first predetermined position.

11. The apparatus according to claim 10 in which:

said lever has a roller;

and said moving means includes linearly movable cam means having cam surfaces cooperating with said roller to control whether said spring or said linearly movable cam means controls the position and movement of said feed in finger.

12. The apparatus according to claim 7 in which:

said lever has a roller;

and said moving means includes linearly movable cam means having cam surfaces cooperating with said roller to control whether said spring or said linearly movable cam means controls the position and movement of said feed in finger.

13. The apparatus according to claim 7 including causing means for causing said moving means to be effective.

14. The apparatus according to claim 7 in which said power means includes a pivotally mounted arm having said moving means connected thereto.

15. A fastener apparatus for attaching a first article to a second article at a setting station including:

support means;

a feed in finger for receiving and engaging a first article at a first predetermined position;

a lever pivotally mounted on said support means and pivotally connected to said feed in finger;

a spring causing said lever to pivot to move said feed in finger along a predetermined path from the first predetermined position to a second predetermined position at the setting station;

moving means acting on said lever for rendering said spring ineffective and moving said feed in finger linearly from the second predetermined position to the first predetermined position;

article engaging means for directly engaging the first article at the second predetermined position after said feed in finger has been moved from the second predetermined position to the first predetermined position, said article engaging means moving the first article into engagement with a second article at the setting station;

and said moving means moving said feed in finger in direct response to movement of said article engaging means.

16. The apparatus according to claim 15 in which said article engaging means engages the first article at the second predetermined position during the same cycle of operation after said feed in finger has been moved from the second predetermined position to the first predetermined position.

* * * * *

UNITED STATES PATENT AND TRADEMARK OFFICE
CERTIFICATE OF CORRECTION

PATENT NO. : 5,933,944
DATED : August 10, 1999
INVENTOR(S) : Volker Schmidt, et. al.

It is certified that error appears in the above-identified patent and that said Letters Patent is hereby corrected as shown below:

Column 6, line 39, after "article" cancel "engages for engaging" and insert --engaging means engages--

Signed and Sealed this

Eighth Day of February, 2000

Attest:

Attesting Officer

Q. TODD DICKINSON

Commissioner of Patents and Trademarks